US011775286B2

(12) United States Patent
Smith et al.

(10) Patent No.: US 11,775,286 B2
(45) Date of Patent: Oct. 3, 2023

(54) SYSTEMS INDUSTRY BENCHMARKING AND CORPORATION SYSTEMS TOOL RECOMMENDATION

(71) Applicant: ADOBE INC., San Jose, CA (US)

(72) Inventors: Kevin Gary Smith, Lehi, UT (US); William Brandon George, Pleasant Grove, UT (US)

(73) Assignee: ADOBE, INC., San Jose, CA (US)

( * ) Notice: Subject to any disclaimer, the term of this patent is extended or adjusted under 35 U.S.C. 154(b) by 104 days.

(21) Appl. No.: 17/450,411

(22) Filed: Oct. 8, 2021

(65) Prior Publication Data

US 2023/0116854 A1 Apr. 13, 2023

(51) Int. Cl.
G06F 9/44 (2018.01)
G06F 8/70 (2018.01)
G06F 8/61 (2018.01)
G06N 20/00 (2019.01)

(52) U.S. Cl.
CPC .......... *G06F 8/70* (2013.01); *G06F 8/61* (2013.01); *G06N 20/00* (2019.01)

(58) Field of Classification Search
CPC ............. G06F 8/70; G06F 8/61; G06N 20/00
See application file for complete search history.

(56) References Cited

U.S. PATENT DOCUMENTS

| 11,119,985 | B1* | 9/2021 | Alagianambi | G06F 9/541 |
| 2008/0127110 | A1* | 5/2008 | Ivanov | G06F 11/3476 |
| | | | | 717/128 |
| 2012/0291022 | A1* | 11/2012 | Mehta | G06F 8/60 |
| | | | | 717/176 |
| 2014/0302837 | A1* | 10/2014 | Ronen | H04W 24/08 |
| | | | | 455/418 |
| 2015/0317563 | A1* | 11/2015 | Baldini Soares | G06N 5/04 |
| | | | | 706/12 |

* cited by examiner

*Primary Examiner* — Hang Pan
(74) *Attorney, Agent, or Firm* — F. CHAU & ASSOCIATES, LLC

(57) ABSTRACT

Systems and methods for software management are described. One or more embodiments of the present disclosure receive first organization data about a first organization that uses a first software system and second organization data about a second organization that uses a second software system; receive first event data from the first organization and second event data from the second organization; generate first converted event data and second converted event data by converting the first event data and the second event data to a common data format; predict organization output based on using the first software system and based on using the second software system; compute a first rating for the first software system and a second rating for the second software system for use in the third organization; and installing the first software system in a computer system of a third organization based on the first rating.

20 Claims, 10 Drawing Sheets

SYSTEMS INDUSTRY BENCHMARKING AND CORPORATION SYSTEMS TOOL RECOMMENDATION

BACKGROUND

The following relates generally to software management, and more specifically to software management data analytics.

Software management systems are systems that monitor and administer software systems. For example, software management systems can be used for discovering useful information, collecting information, and informing conclusions about software implementation. Different departments within a corporation can use different software systems to perform tasks such as project management and customer relationship management. Software management systems can manage the software across a business.

In some cases, the effectiveness of software can depend on a number of organization-specific factors. For example, a file management application that is useful in a first company may be different from another file management application in a second company (e.g., because the companies track different things, receive input data having different data format, use different software configurations, etc.). Conventional software management systems are unable to provide useful guidance regarding which software an organization should implement. This can result in the selection of software that is unsuitable for the needs of a particular organization. Therefore, there is a need in the art for improved software management systems that can provide information regarding the selection and configuration of software across an organization.

SUMMARY

The present disclosure describes systems and methods for software management. Some embodiments of the disclosure include a software management apparatus configured to convert event data from multiple different software systems to a common data format using a data normalizing layer. The software management apparatus can be used to compute ratings of the different software systems used in several companies. Rating information indicates a matching score for a certain software tool to be installed in a computer system of the target company based on the predicted organization output and the target company data. Additionally, the software management apparatus can provide software configuration recommendations based on companies using a same software application. In some examples, a machine learning model is trained to predict organization output based on the training data including training organization data for a set of organizations and training organization output for each of the set of organizations.

A method, apparatus, and non-transitory computer readable medium for software management are described. One or more embodiments of the method, apparatus, and non-transitory computer readable medium include receiving first organization data about a first organization that uses a first software system and second organization data about a second organization that uses a second software system; receiving first event data from the first organization in a first format used by the first software system and second event data from the second organization in a second format used by the second software system, wherein the first format is different from the second format; generating first converted event data and second converted event data by converting the first event data and the second event data to a common data format, the common data format including a software system field; predicting organization output based on using the first software system and based on using the second software system, wherein the predicted organization output is based on the first organization data, the second organization data, the first converted event data, and the second converted event data; receiving third organization data about a third organization; computing a first rating for the first software system and a second rating for the second software system for use in the third organization based on the predicted organization output and the third organization data, wherein the first rating indicates a matching score between the first software system and the third organization, and wherein the second rating indicates a matching score between the second software system and the third organization; and installing the first software system in a computer system of the third organization based on the first rating, wherein the first software performs functions of the third organization including generating data in the first format.

A method, apparatus, and non-transitory computer readable medium for software management are described. One or more embodiments of the method, apparatus, and non-transitory computer readable medium include receiving first software configuration data from a first organization that uses a software system and second software configuration data from a second organization that uses the software system; receiving first event data from the first organization in a first format and second event data from the second organization in a second format; generating first converted event data and second converted event data by converting the first event data and the second event data to a common data format, the common data format including a software configuration field; predicting organization output for the software system based on the first software configuration data, the second software configuration data, the first converted event data, and the second converted event data; receiving organization data about a third organization; generating a recommended software configuration for the third organization based on the predicted organization output and the organization data about the third organization; and configuring the software system for the third organization based on the recommended software configuration.

An apparatus and method for software management are described. One or more embodiments of the apparatus and method include a data conversion component configured to generate first converted event data and second converted event data by converting first event data and second event data to a common data format, the common data format including a software system field, wherein the first event data is obtained from a first software system and the second event data is obtained from a second software system; a prediction network configured to predict organization output based on using the first software system and based on using the second software system, wherein the predicted organization output is based on a first organization data, a second organization data, the first converted event data, and the second converted event data; a rating component configured to compute a first rating for the first software system and a second rating for the second software system for use in a third organization based on the predicted organization output and third organization data; and an installation component configured to install the first software system in a computer system of the third organization based on the first rating.

DETAILED DESCRIPTION

Figure 1:
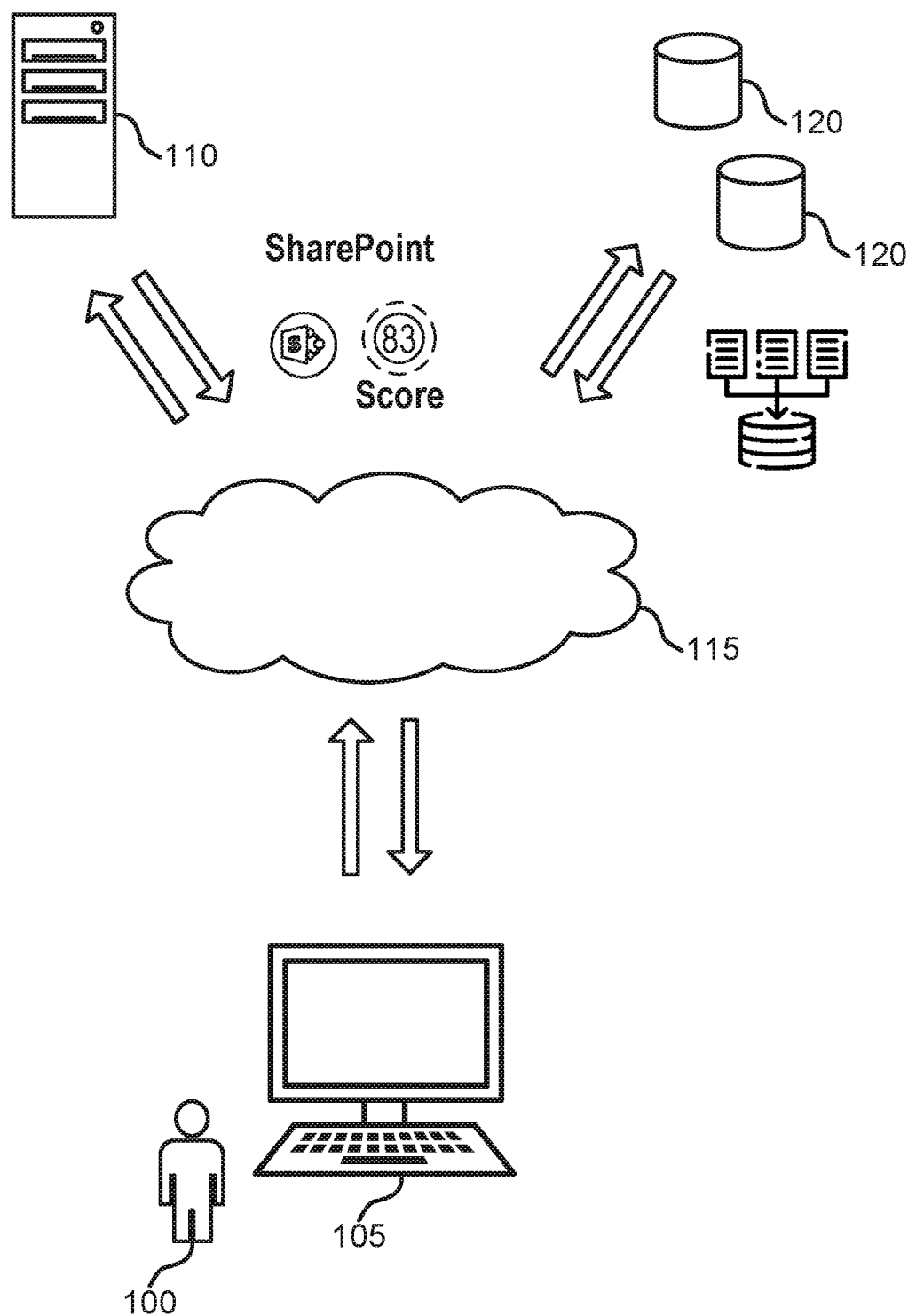
FIG. 1 shows an example of a software management system according to aspects of the present disclosure.

The present disclosure describes systems and methods for software management. Some embodiments of the disclosure include a software management apparatus configured to convert event data from multiple different software systems to a common data format using a data normalizing layer. The software management apparatus computes ratings of the different software systems used in several companies. Rating information indicates a matching score for a certain software tool to be installed in a computer system of the target company based on the predicted organization output and the target company data. Additionally, the software management apparatus provides software configuration recommendations based on companies using a same software application. In some examples, a machine learning model is trained to predict organization output based on the training data including training organization data for a set of organizations and training organization output for each of the set of organizations.

Project management systems and other software systems are widely used to plan, schedule sequential activities, manage resources, and track workflow in business organizations. However, different organizations use different software systems for various types of task management, monitoring and reporting. As a result, a software tool that is suitable for a first company may not be appropriate for a second company. For example, the goals, motivations and organizational structure of different organizations can be quite different from each other. Accordingly, software tools used by one organization is not necessarily appropriate for another organization, even if they are in the same industry.

Companies use different software tools and services dependent on the number of employees, customers, processes and production level. In some cases, companies outgrow existing toolsets and need upgrades or replacements of these software applications. A company considers factors such as cost, scalability, future needs and use cases, and fitness of a software tool into the overall work management system. Additionally, cost of replacing an existing tool provides incentive to keep using an existing tool in the original ineffective configuration, resulting in continued expenses due to lower productivity, quality, or performance. As a result, selecting the correct software and associated configuration is important.

Conventional software management systems fail to provide meaningful information about the interaction of events in different companies that are tracked using different kinds of software. For example, the systems do not provide insight into the comparative performance of a target company with peers in the industry. Furthermore, the systems do not evaluate whether a target company has installed the most efficient tool for different tasks based on industry benchmarking analytics. As a result, those in positions of leadership have a hard time understanding the effect of a particular software system or software configuration on the entire organization.

Some embodiments of the present disclosure receive event data from multiple different software systems and normalize the event data into a common data format for subsequent evaluation. In some embodiments, a software management apparatus is configured to compute rating information and software configuration information, and recommends tools that will help an organization operate efficiently. In some examples, a software management apparatus is configured to determine the comparative conformance of a particular software system in the relevant industry. In some examples, a dynamic and analytical user interface (UI) enables users such as business executives to understand the effect of changes in software systems or the effect of software configurations on the entire organization.

According to an embodiment, users may view the company workline or software integration from an organization level and view the effect of software tools on different parts of the organization using the software management apparatus. Any work and the associated attributes and metadata are tracked and recorded for subsequent information retrieval. For example, a search query (e.g., "what is the best file management tool for a target company") is input to the software management apparatus via the user interface to filter, aggregate and display results in real-time. In some examples, the software management apparatus receives training data including training software configuration data for a set of organizations and training organization output for each of the set of organizations and a machine learning model is trained to predict the organization output based on the training data.

By converting data from multiple organizations to a common format and using a machine learning model to predict performance, embodiments of the present disclosure provide more accurate software and software configuration recommendations that are suitable for the unique needs of an organization. This leads to reductions in cost, improved performance, and reductions in training time.

In the present disclosure, the term "metric" refers to a property, a type or an attribute of information. In some examples, metrics include number of requests (tasks) at each state, number of resources (headcount) at each state, number of person-hours spent on the current requests at each state, and number of blocked tasks at each state. Additionally, metrics include request velocity at each state (or overall) above or below benchmarks or goals at each state (or overall), and trends over time (compared to last year). Metrics may also include custom calculations of customer or employee satisfaction, bottlenecks, innovation scores, etc. However, embodiments of the present disclosure are not limited to above-mentioned examples of metrics.

The term "event data" refers to actions, events, phases, or other data that is tracked by a software system that can be associated with a point or range in time. In some cases, event data includes metrics, which represent values that measure a quantity associated with the event data such as cost, man-hours, priority, complexity, or other values that can be measured quantitatively.

The term "time series data" refers so event data that is combined into a format where the time associated with the event data is comparable to the time associated with other events (e.g., where events are associated with a timeline). In some examples, the values for a given metric correspond to an extended period of time, and in some other examples the values are associated with a particular point in time. According to an embodiment of the present disclosure, time series data collected for a variety of metrics (i.e., a first converted event data, a second converted event data) may be combined to form combined time series data.

The term "data format" refers to a schema for representing event data. The data format may include data fields that represent the type of event, a point or range of time associated with an event, people associated with the event, and other metrics such as cost or value.

The term "common data format" refers to a data format that represents information from one or more source data formats. In some cases, the common data format includes fields that map to one or more fields from the source data formats. For example, the common data format may have a field with a different identifier (e.g., Last Name) that corresponds to a field in a source data format with a different identifier (e.g., Family Name). In some cases, the common data format does not include fields that are included in one or more source formats. In some cases, the common data format includes fields that can be programmatically determined from one or more fields in a source data format (e.g., a "Average Amount" field can be determined by averaging multiple different amount fields).

Embodiments of the present disclosure may be used in the context of project management. For example, a software management system based on the present disclosure may be used to integrate and normalize data coming from multiple different software systems to produce common formatted data. Subsequently, the software management system computes rating information enabling software and configuration recommendation. An example application in the project management context is provided with reference to FIGS. 1-4. Details regarding the architecture of an example software management apparatus are provided with reference to FIGS. 5-6. An example of a process for computing rating information is provided with reference to FIG. 7. An example of a process for generating a recommended software configuration is provided with reference to FIG. 8.

Software Management System

FIG. 1 shows an example of a software management system according to aspects of the present disclosure. The example shown includes user 100, user device 105, software management apparatus 110, cloud 115, and database 120.

In the example of FIG. 1, first event data from a first software system and second event data from a second software system may be stored in database 120. The first event data is formatted using a first data format while the second event data is formatted using a second data format. Software management apparatus 110 can communicate with database 120 and retrieve the stored event data. Software management apparatus 110 generates first converted event data and second converted event data by converting the first event data and the second event data to a common data format.

Additionally, software management apparatus 110 receives first organization data about a first organization that uses a first software system and second organization data about a second organization that uses a second software system. Subsequently, software management apparatus 110 predicts organization output based on using the first software system and based on using the second software system. In some cases, the predicted organization output is based on the first organization data, the second organization data, the first converted event data, and the second converted event data.

Software management apparatus 110 receives third organization data about a target company and computes a first rating for the first software system and a second rating for the second software system for use in the target company. The user 100 communicates with the software management apparatus 110 via the user device 105 and the cloud 115. For example, the user 100 may query software management apparatus 110 to display rating information of a recommended tool that the user 100 is interested. As an example, the user 100 is a business executive of the target company and is interested in selecting a file management application. The user device 105 transmits the query to software management apparatus 110. Software management apparatus 110 outputs a rating of 83 points and recommends SharePoint tool for installation. SharePoint is then installed in a computer system of the target company based on the rating. In some examples, a user interface may be implemented on user device 105.

A user interface may enable a user 100 to interact with a device. In some embodiments, the user interface may include an audio device, such as an external speaker system, an external display device such as a display screen, or an input device (e.g., remote control device interfaced with the user interface directly or through an IO controller module). In some cases, a user interface may be a graphical user interface (GUI).

The user device 105 may be a personal computer, laptop computer, mainframe computer, palmtop computer, personal assistant, mobile device, or any other suitable processing apparatus. In some examples, the user device 105 includes software that incorporates a software management application. The software management application may either include or communicate with the software management apparatus 110. Alternatively or additionally, the user device 105 includes a user interface so that a user 100 can upload a query and/or view information via the user interface.

Software management apparatus 110 comprises a data conversion component, a prediction network, a rating component, an installation component, a training component, and a configuration component. Software management apparatus 110 receives first organization data about a first organization that uses a first software system and second organization data about a second organization that uses a second software system; receives first event data from the first organization in a first format used by the first software system and second event data from the second organization in a second format used by the second software system.

Software management apparatus 110 generates first converted event data and second converted event data by converting the first event data and the second event data to a common data format, the common data format including a software system field. Next, software management apparatus 110 predicts organization output based on using the first software system and based on using the second software system, wherein the predicted organization output is based on the first organization data, the second organization data, the first converted event data, and the second converted event data.

Software management apparatus 110 receives third organization data about a third organization; computing a first rating for the first software system and a second rating for the second software system for use in the third organization based on the predicted organization output and the third organization data; and installs the first software system in a computer system of the third organization based on the first rating. Software management apparatus 110 is an example of, or includes aspects of, the corresponding element described with reference to FIG. 5.

Software management apparatus 110 may also include a processor unit and a memory unit. Additionally, software management apparatus 110 can communicate with the database 120 via the cloud 115. Further detail regarding the architecture of software management apparatus 110 is provided with reference to FIGS. 5-6. Further detail regarding a process for computing rating information is provided with reference to FIG. 7. Further detail regarding a process for generating a recommended software configuration is provided with reference to FIG. 8.

In some cases, software management apparatus 110 is implemented on a server. A server provides one or more functions to users linked by way of one or more of the various networks. In some cases, the server includes a single microprocessor board, which includes a microprocessor responsible for controlling all aspects of the server. In some cases, a server uses microprocessor and protocols to exchange data with other devices/users on one or more of the networks via hypertext transfer protocol (HTTP), and simple mail transfer protocol (SMTP), although other protocols such as file transfer protocol (FTP), and simple network management protocol (SNMP) may also be used. In some cases, a server is configured to send and receive hypertext markup language (HTML) formatted files (e.g., for displaying web pages). In various embodiments, a server comprises a general purpose computing device, a personal computer, a laptop computer, a mainframe computer, a super computer, or any other suitable processing apparatus.

A cloud 115 is a computer network configured to provide on-demand availability of computer system resources, such as data storage and computing power. In some examples, the cloud 115 provides resources without active management by the user. The term cloud is sometimes used to describe data centers available to many users over the Internet. Some large cloud networks have functions distributed over multiple locations from central servers. A server is designated an edge server if it has a direct or close connection to a user. In some cases, a cloud 115 is limited to a single organization. In other examples, the cloud is available to many organizations. In one example, a cloud 115 includes a multi-layer communications network comprising multiple edge routers and core routers. In another example, a cloud 115 is based on a local collection of switches in a single physical location.

A database 120 is an organized collection of data. For example, a database 120 stores data in a specified format known as a schema. A database 120 may be structured as a single database, a distributed database, multiple distributed databases, or an emergency backup database. In some cases, a database controller may manage data storage and processing in a database 120. In some cases, a user interacts with database controller. In other cases, database controller may operate automatically without user interaction.

Figure 2:
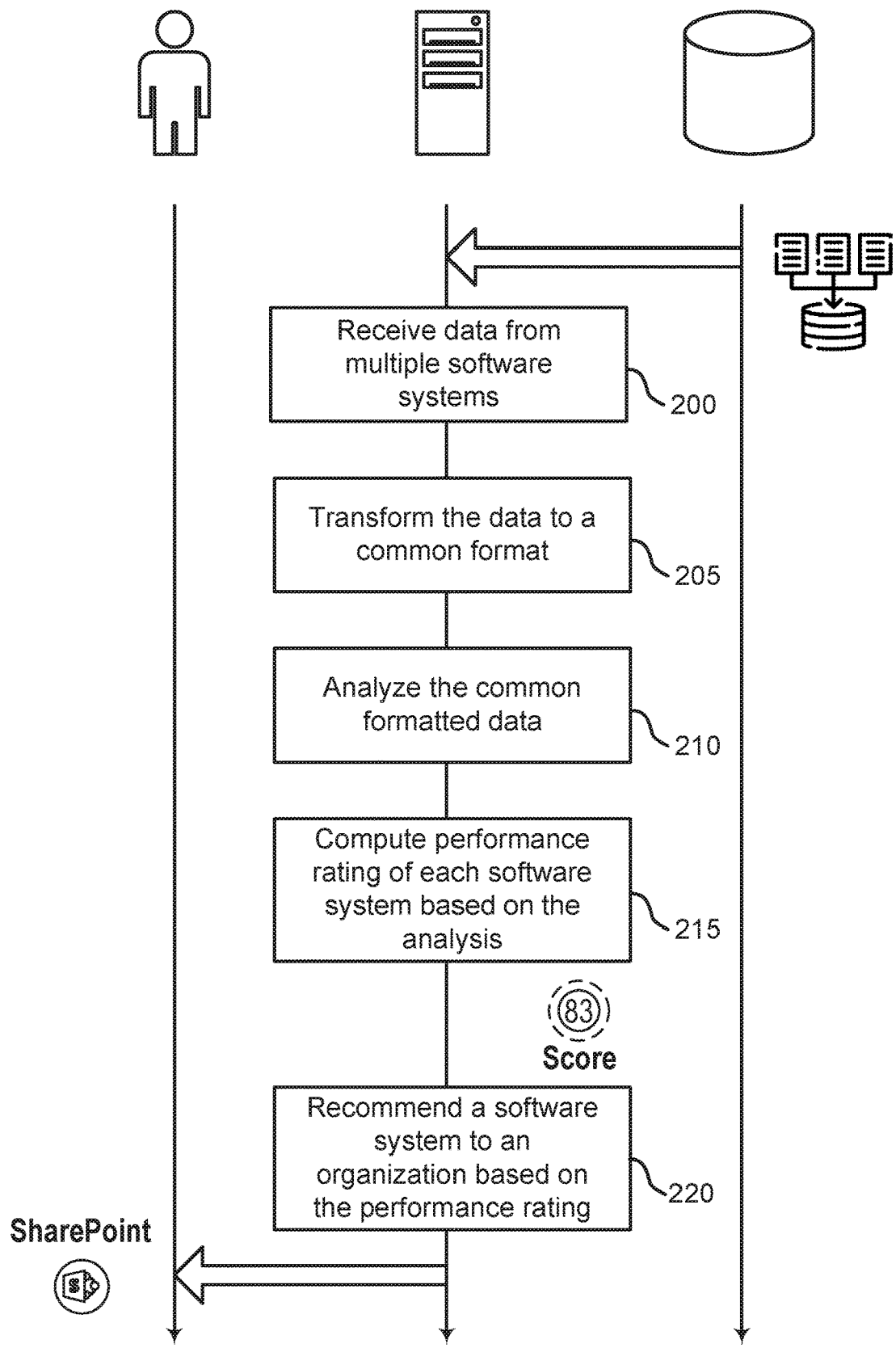
FIG. 2 shows an example of a process for software management according to aspects of the present disclosure.

FIG. 2 shows an example of a process for software management according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 200, the system receives data from multiple software systems. In some cases, the operations of this step refer to, or may be performed by, a software management apparatus as described with reference to FIGS. 1 and 5.

Companies use multiple external tools and services to perform everyday work including collaboration tools, customer relationship management (CRM), accounting software, vendor onboarding services to marketing platforms, etc. Every software tool may perform differently based on the other tools used concurrently by a target company. The cost of a tool, integration of the tool into the target company's system or replacing the tool can be costly. As a result, selecting an appropriate tool for each job is important.

At operation 205, the system transforms the data to a common format. In some cases, the operations of this step refer to, or may be performed by, a software management apparatus as described with reference to FIGS. 1 and 5. In some examples, a normalization layer of the system is used to convert event data to a common data format.

At operation 210, the system analyzes the common formatted data. In some cases, the operations of this step refer to, or may be performed by, a software management apparatus as described with reference to FIGS. 1 and 5.

The system receives event data coming from multiple different software systems that would be normalized into a common data format. The user creates a data schema that indicates a list of properties that may be populated (some may be required; some may be optional). Each property is associated with a data type as well (e.g., string, integer). Each event (which contains multiple properties itself) from each software system is then mapped into these properties of the final normalized data schema. In some examples, an optional list of rules is applied on a per-system basis, which perform small extract-transform-load (ETL) operations, as well as any property name mapping conversions. Any non-relevant property from the incoming event that is not serialized into the normalized schema would be discarded.

At operation 215, the system computes performance rating of each software system based on the analysis. In some cases, the operations of this step refer to, or may be performed by, a software management apparatus as described with reference to FIGS. 1 and 5.

At operation 220, the system recommends a software system to an organization based on the performance rating. In some cases, the operations of this step refer to, or may be performed by, a software management apparatus as described with reference to FIGS. 1 and 5. One or more embodiments of the present disclosure include automating a process of selecting the tools for the target company and configuring the tools based on features such as the company's vertical, internal processes, current tool set and benchmarked data about similar companies in the relevant industry.

In some examples, the software management apparatus can determine if the company is spending too much on a service without exposing costs or names of peers that are spending less. Additionally, sufficient data quantity and quality ensure that consumers cannot deduce information provided by the tool (i.e., maintain data privacy).

According to an embodiment, the software management system is configured to aggregate data into an industry benchmark that further help a target company evaluate the performance of the company's internal systems. The software management system is configured for operational benchmarking at a tool or service level which are combined to create benchmarks at multiple levels such as category, team, multi-tool systems, department, geography and company. The overall success of a company relates to the usage metrics of individual services and tools by combining operational tool usage statistics with downstream success metrics.

Figure 3:
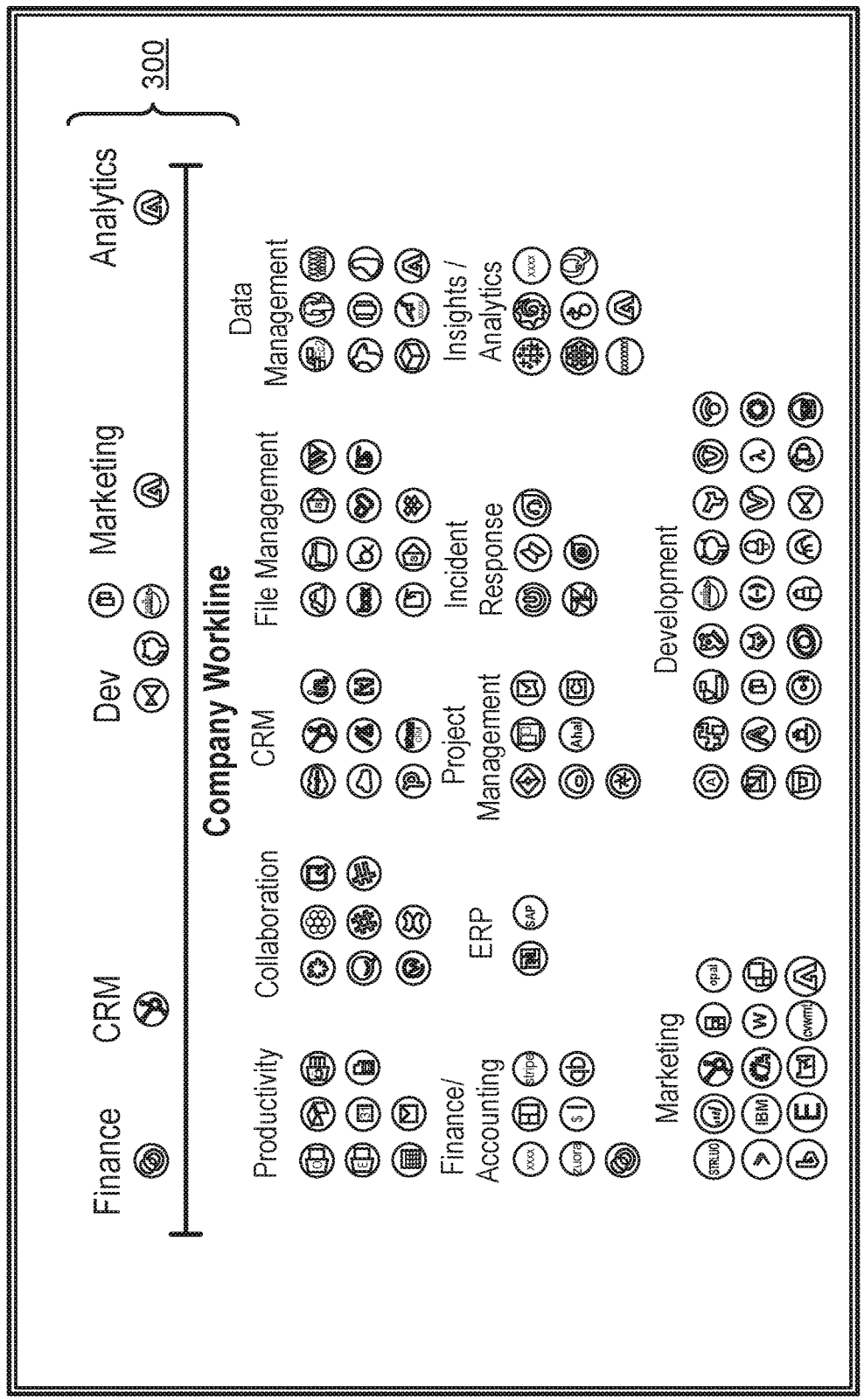
FIG. 3 shows an example of a company workline according to aspects of the present disclosure.

FIG. 3 shows an example of a company workline according to aspects of the present disclosure. Each software tool selected may impact the performance of other tools in the company workline 300. In some cases, the connections between tools are difficult to detect and evaluate since the services are used by different departments and at very different times in the company workline 300. Company workline 300 is an example of, or includes aspects of, the corresponding element described with reference to FIG. 4.

According to an embodiment, the software management system includes a user interface (UI) which shows the most popular tools for companies like the current users. The initial list may be generic and may be refined based on information already added to the system. For example, attaching to lightweight directory access protocol (LDAP) may provide information about company structure, geography (overall and for specific teams) and processes. A user can click on any of the tool types (or using a search etc.) can show additional tools for a particular tool category and a manual entry is enabled and included for custom services.

According to an embodiment, a user first adds all the tools currently being used to create the company workline 300. As the user clicks on icons representing tools, the tools are added to the company workline 300 in the most logical places and use cases based on company benchmarking. A user may drag or copy tools to other parts of the company workline 300 in cases where the tool is used in a different or in multiple capacities.

The software management system identifies the tools used and the capacity of use by the company when the current set of tools are added and arranged. In some cases, the company workline 300 represents a chronological workflow and the tool has insight into the inputs and outputs of each tool.

Figure 4:
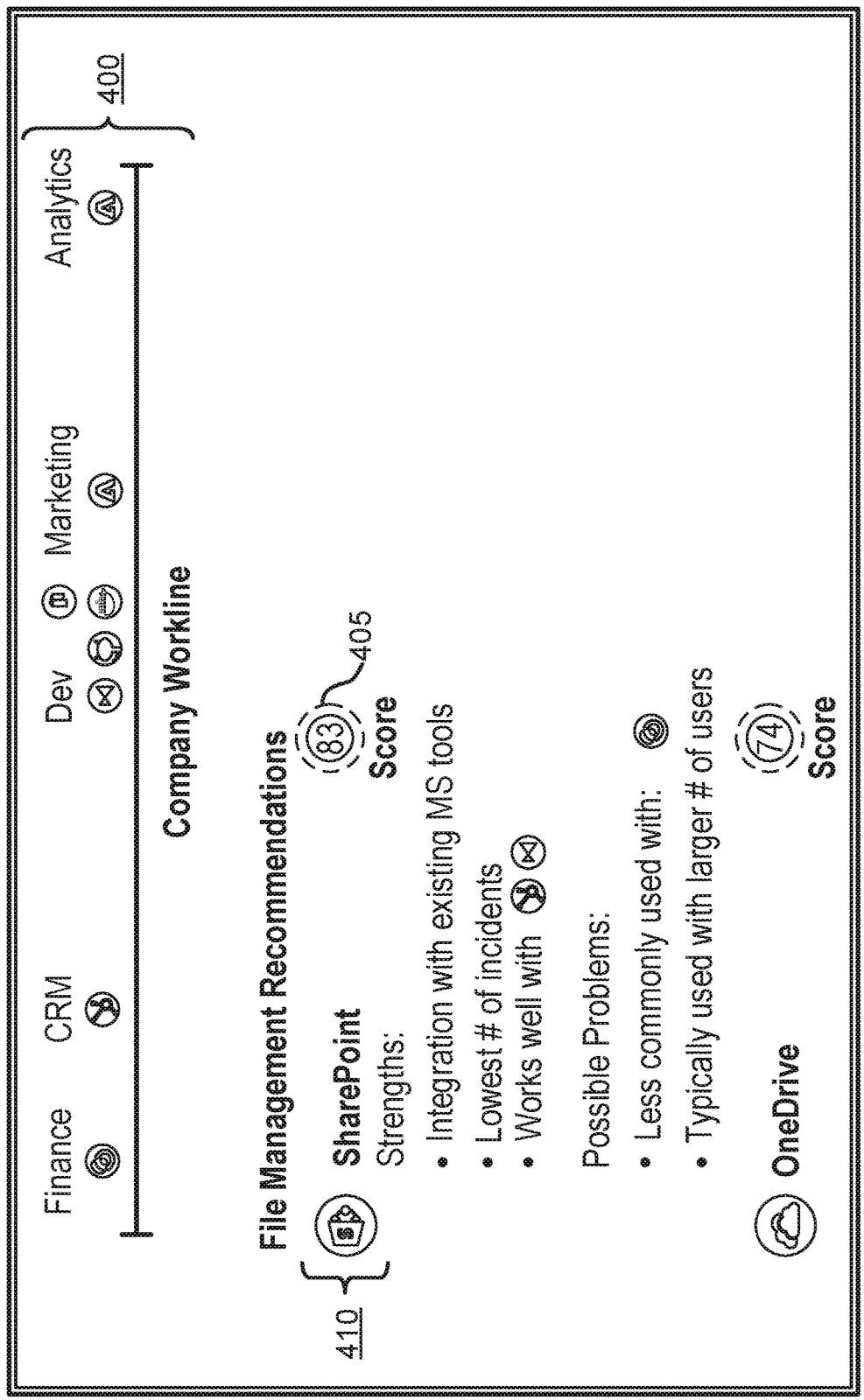
FIG. 4 shows an example of computing rating associated with a software application according to aspects of the present disclosure.

FIG. 4 shows an example of computing rating associated with a software application 410 according to aspects of the present disclosure. The example shown includes company workline 400, rating 405, and software application 410.

Once all the existing tools are added to the company workline 400, the software management system can finalize assumptions about each software tool and assume the most likely configuration options before walking a user through decisions for manual approval. Company workline 400 is an example of, or includes aspects of, the corresponding element described with reference to FIG. 3.

Processes and task management, benchmarks can be used to recommend additional tools that are suitable for the current organization and eco-system (i.e., upstream and downstream) once the company workline 400 is defined with the current toolset. For example, the company may be looking for a new file management vendor. The software management system can recommend a most suitable file management vendor for the company, and highlight potential benefits and problems for each vendor the company considers. The system can conduct automated evaluation of the company's system and the benchmarking information from the other companies using the same information.

In some examples, benchmarking enables reporting at multiple granularities such as tool, tool combination, tool category, team, department, geographical, and company granularities. Tool granularity refers to the usage of a particular customer relationship management (CRM) tool compared to other companies. Tasks depend on multiple tools and the output of one tool is often the input of others. Tool combination granularity refers to evaluating systems and subsystems of tools. Tool category granularity combines all tools in a single category (e.g., incident management). Multiple teams may use the same tools but have different levels of issues and successes. Team granularity refers to a process of highlighting the teams and practices that teams struggling and the teams that could be used as templates for the struggling teams. Department granularity refers to comparison of efficiency, size, etc. between departments of competitor organizations. In some examples, one or more tools fit or perform better in different geographies and/or culture (i.e., referred to as geographical granularity). Company granularity is the aggregation of all types of granularities. According to an example, an example report generated by the software management system includes:

TABLE 1

Example Rating Comparison Information
Tool: Aha! Project Management
Category: Project Management
Comparison: All Tool Users

|  | Your Score | Industry Average |  |
| --- | --- | --- | --- |
| Tool | 6.3 | 7.2 | View Details |
| Tool in all categories | 6.3 | 6.8 | View Details |
| Number of weekly tasks | 18 | 31 | View Details |
| Number of tool users | 5 | 11 | View Details |
| etc. | | | |

According to an embodiment, the software management system computes a first rating 405 for the first software system and a second rating 405 for the second software system for use in a third organization (i.e., target user company) based on the predicted organization output and the third organization data. In some examples, the third organization is looking for file management vendor recommendation. The software management system computes a rating of 83 points for SharePoint. The software management system computes a rating of 74 points for OneDrive. The software management system installs SharePoint (having a higher rating score) in a computer system of the third organization based on the first rating.

Software Management System Architecture

Figure 5:
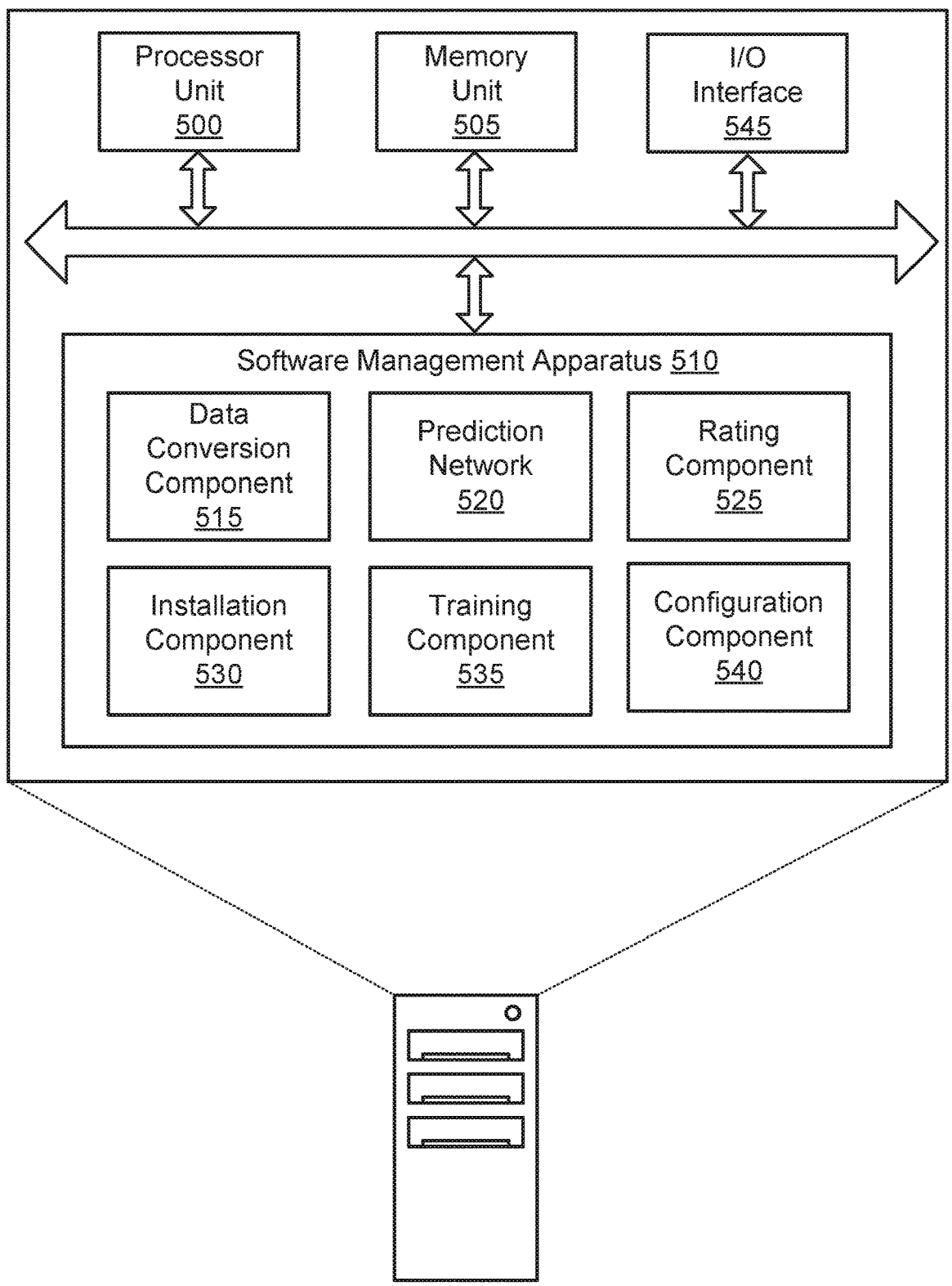
FIG. 5 shows an example of a software management apparatus according to aspects of the present disclosure.
Figure 6:
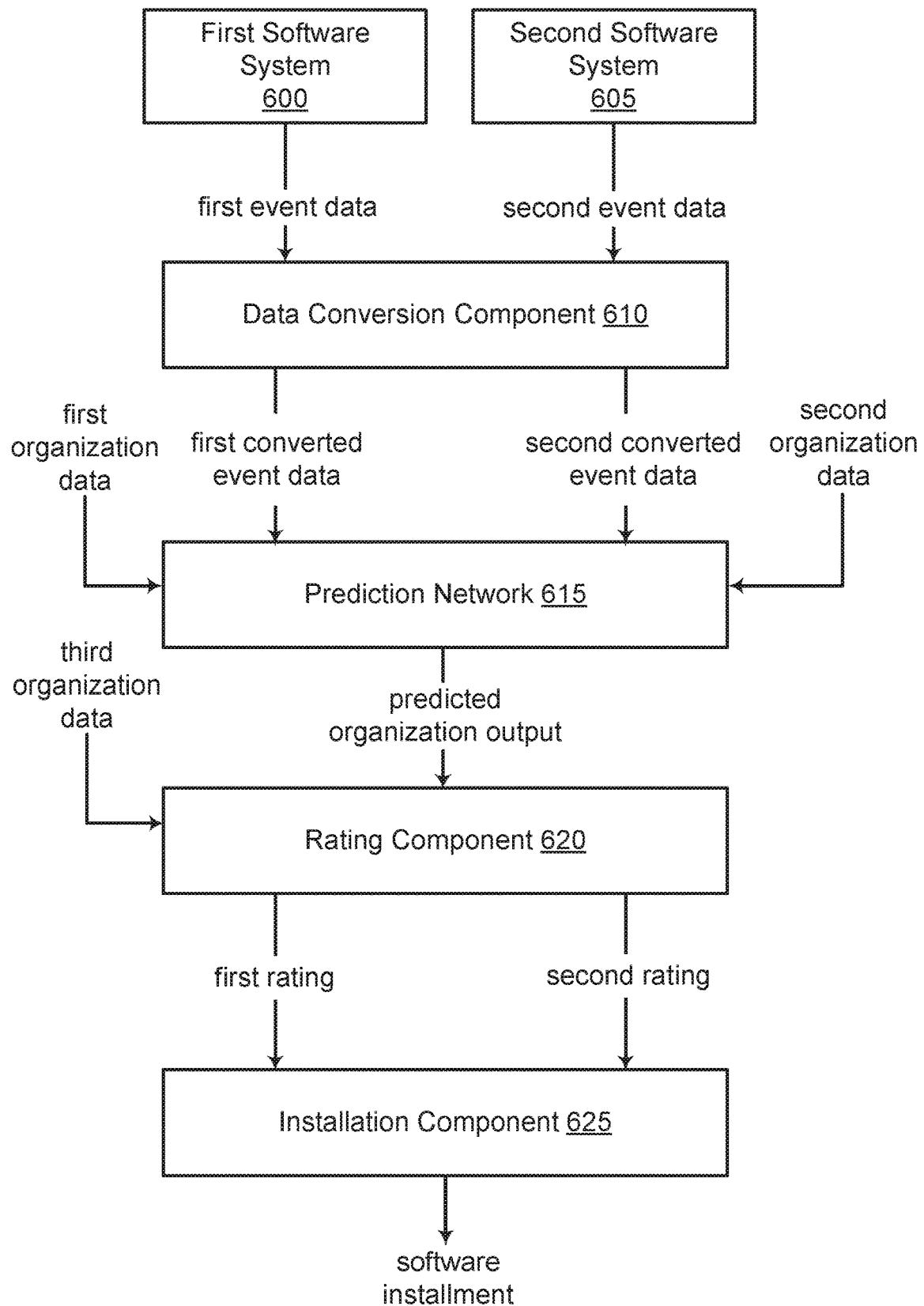
FIG. 6 shows an example of a software management diagram according to aspects of the present disclosure.

In FIGS. 5-6, an apparatus and method for software management are described. One or more embodiments of the apparatus and method include a data conversion component configured to generate first converted event data and second converted event data by converting first event data and second event data to a common data format, the common data format including a software system field, wherein the first event data is obtained from a first software system and the second event data is obtained from a second software system; a prediction network configured to predict organization output based on using the first software system and based on using the second software system, wherein the predicted organization output is based on a first organization data, a second organization data, the first converted event data, and the second converted event data; a rating component configured to compute a first rating for the first software system and a second rating for the second software system for use in a third organization based on the predicted organization output and third organization data; and an installation component configured to install the first software system in a computer system of the third organization based on the first rating.

Some examples of the apparatus and method further include a training component configured to receive training data comprising training organization data for a plurality of organizations and training organization output for each of the plurality of organizations, wherein each of the plurality of organizations uses the first software system or the second software system, and to train a model for predicting the organization output based on the training data.

Some examples of the apparatus and method further include a configuration component configured to configure the first software system based on the predicted organization output.

FIG. 5 shows an example of a software management apparatus according to aspects of the present disclosure. The example shown includes processor unit 500, memory unit 505, software management apparatus 510, and I/O interface 545. Software management apparatus 510 further includes data conversion component 515, prediction network 520, rating component 525, installation component 530, training component 535, and configuration component 540. Software management apparatus 510 is an example of, or includes aspects of, the corresponding element described with reference to FIG. 1.

A processor unit 500 is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, the processor unit 500 is configured to operate a memory array using a memory controller. In other cases, a memory controller is integrated into the processor. In some cases, the processor unit 500 is configured to execute computer-readable instructions stored in a memory to perform various functions. In some embodiments, a processor unit 500 includes special purpose components for modem processing, baseband processing, digital signal processing, or transmission processing.

Examples of a memory unit 505 include random access memory (RAM), read-only memory (ROM), or a hard disk. Examples of memory unit 505 include solid state memory and a hard disk drive. In some examples, a memory unit 505 is used to store computer-readable, computer-executable software including instructions that, when executed, cause a processor to perform various functions described herein. In some cases, the memory unit 505 contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory unit 505 store information in the form of a logical state.

Software may include code to implement aspects of the present disclosure. Software may be stored in a non-transitory computer-readable medium such as system memory or other memory. In some cases, the software may not be directly executable by the processor but may cause a computer (e.g., when compiled and executed) to perform functions described herein.

I/O interface 545 (input/output interface) may include an I/O controller. An I/O controller may manage input and output signals for a device. I/O controller may also manage peripherals not integrated into a device. In some cases, an I/O controller may represent a physical connection or port to an external peripheral. In some cases, an I/O controller may utilize an operating system such as iOS®, ANDROID®, MS-DOS®, MS-WINDOWS®, OS/2®, UNIX®, LINUX®, or another known operating system. In other cases, an I/O controller may represent or interact with a modem, a keyboard, a mouse, a touchscreen, or a similar device. In some cases, an I/O controller may be implemented as part of a processor. In some cases, a user may interact with a device via I/O controller or via hardware components controlled by an IO controller.

In some examples, I/O interface 545 includes user interface. A user interface may enable a user to interact with a device. In some embodiments, the user interface may include an audio device, such as an external speaker system, an external display device such as a display screen, or an input device (e.g., remote control device interfaced with the user interface directly or through an IO controller module). In some cases, a user interface may be a graphical user interface (GUI). In some examples, a communication interface operates at the boundary between communicating entities and the channel and may also record and process communications. Communication interface is provided herein to enable a processing system coupled to a transceiver (e.g., a transmitter and/or a receiver). In some examples, transceiver is configured to transmit (or send) and receive signals for a communications device via an antenna.

According to some embodiments of the present disclosure, the software management apparatus 510 includes a computer implemented artificial neural network (ANN) that predicts organization data for a given target company. An ANN is a hardware or a software component that includes a number of connected nodes (i.e., artificial neurons), which loosely correspond to the neurons in a human brain. Each connection, or edge, transmits a signal from one node to another (like the physical synapses in a brain). When a node receives a signal, it processes the signal and then transmits the processed signal to other connected nodes. In some cases, the signals between nodes comprise real numbers, and the output of each node is computed by a function of the sum of its inputs. Each node and edge is associated with one or more node weights that determine how the signal is processed and transmitted.

According to an embodiment, software management apparatus 510 includes a software management system. In some cases, software management apparatus 510 and software management system are used interchangeably. The software management system receives first organization data about a first organization that uses a first software system and second organization data about a second organization that uses a second software system. The software management system receives first event data from the first organization in a first format used by the first software system and second event data from the second organization in a second format used by the second software system. The software management system receives third organization data about a third organization.

In some examples, the first organization data and the second organization data comprise elements from a list comprising function data, cost data, usage data, inputs data, outputs data, success metrics data, efficiency data, throughput data, or any combination thereof. In some examples, the usage data comprises number of requests, average request duration, percentage of requests that is resolved or rejected, types of tasks spawned, number of total users, frequent users, and number of bottlenecks.

According to an embodiment, the software management system identifies a first department of the first organization that uses the first software system, identifies a second department of the second organization that corresponds to the first department of the first organization, and identifies the second software system based on the second department of the second organization. In some examples, the first event data and the second event data comprise task creation data, task state change data, task completion data, or any combination thereof.

According to an embodiment, the software management system receives first software configuration data from a first organization that uses a software system and second software configuration data from a second organization that uses the software system. The software management system receives first event data from the first organization in a first format and second event data from the second organization in a second format. The software management system receives organization data about a third organization.

In some examples, the organization data comprises elements from a list comprising blogs, product reviews, current trends, employee's past experience, company values, toolset, number of users, company size, and user geography. In some examples, the organization data is obtained from a lightweight directory access protocol (LDAP).

According to some embodiments, data conversion component 515 generates first converted event data and second converted event data by converting the first event data and the second event data to a common data format, the common data format including a software system field. The first event data is obtained from a first software system and the second event data is obtained from a second software system. In some examples, the first software system does not produce data in the second data format. The first software system has a software category from a list comprising a human resources category, a project management category, a code tracking category, an intellectual property tracking category, a marketing category, a customer relationship management category, and an accounting category. The second software system includes a same category as the first software system.

In some examples, data conversion component 515 identifies a correspondence between a first property of the first format and a common property of the common data format. Next, data conversion component 515 populates the common property of the first converted event data based on the first property of the first event data and the correspondence.

According to some embodiments, data conversion component 515 generates first converted event data and second converted event data by converting the first event data and the second event data to a common data format, the common data format including a software configuration field. Data conversion component 515 is an example of, or includes aspects of, the corresponding element described with reference to FIG. 6.

According to some embodiments, prediction network 520 predicts organization output based on using the first software system and based on using the second software system, where the predicted organization output is based on the first organization data, the second organization data, the first converted event data, and the second converted event data.

According to some embodiments, prediction network 520 predicts organization output for the software system based on the first software configuration data, the second software configuration data, the first converted event data, and the second converted event data.

According to some embodiments, prediction network 520 is configured to predict organization output based on using the first software system and based on using the second software system, wherein the predicted organization output is based on a first organization data, a second organization data, the first converted event data, and the second converted event data. Prediction network 520 is an example of, or includes aspects of, the corresponding element described with reference to FIG. 6.

According to some embodiments, rating component 525 computes a first rating for the first software system and a second rating for the second software system for use in the third organization based on the predicted organization output and the third organization data. In some examples, rating component 525 computes an industry average rating based on the first rating and the second rating.

According to some embodiments, rating component 525 generates a recommended software configuration for the third organization based on the predicted organization output and the organization data about the third organization. In some examples, rating component 525 computes a rating for the software system for use in the third organization based on the predicted organization output. Rating component 525 is an example of, or includes aspects of, the corresponding element described with reference to FIG. 6.

According to some embodiments, installation component 530 installs the first software system in a computer system of the third organization based on the first rating. Installation component 530 is an example of, or includes aspects of, the corresponding element described with reference to FIG. 6.

According to some embodiments, training component 535 receives training data including training organization data for a set of organizations and training organization output for each of the set of organizations, where each of the set of organizations uses the first software system or the second software system. Training component 535 trains a model for predicting the organization output based on the training data.

According to some embodiments, training component 535 receives training data including training software configuration data for a set of organizations and training organization output for each of the set of organizations. Training component 535 trains a model for predicting the organization output based on the training data. In some examples, the model includes a machine learning model that is trained based on industry information, company structure information, geography information, toolset information, or arrangement information.

According to some embodiments, configuration component 540 configures the software system for the third organization based on the recommended software configuration. According to some embodiments, configuration component 540 is configured to configure the first software system based on the predicted organization output.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

FIG. 6 shows an example of a software management diagram according to aspects of the present disclosure. The example shown includes first software system 600, second software system 605, data conversion component 610, prediction network 615, rating component 620, and installation component 625.

According to some embodiments, the first software system 600 does not produce data in the second data format. The first software system 600 has a software category from a list including a human resources category, a project management category, a code tracking category, an intellectual property tracking category, a marketing category, a customer relationship management category, and an accounting category. In some embodiments, the second software system 605 includes a same category as the first software system 600.

As illustrated in FIG. 6 (from top to bottom), according to some embodiments, the first software system 600 generates first event data while the second software system 605 generates second event data. The first event data and the second event data are input to data conversion component 610. Data conversion component 610 is an example of, or includes aspects of, the corresponding element described with reference to FIG. 5. Data conversion component 610 transforms first event data to first converted event data and transforms second event data to second converted event data.

The first converted event data and the second converted event data are input to prediction network 615. First organization data and second organization data are also input to prediction network 615. Prediction network 615 is an example of, or includes aspects of, the corresponding element described with reference to FIG. 5. Prediction network 615 generates predicted organization output.

The predicted organization output is input to rating component 620. Rating component 620 is an example of, or includes aspects of, the corresponding element described with reference to FIG. 5. Rating component 620 receives third organization data about a third organization. Rating component 620 computes a first rating for the first software system and a second rating for the second software system for use in the third organization based on the predicted organization output and the third organization data.

Installation component 625 installs the first software system in a computer system of the third organization based on the first rating. In some cases, installation component 625 installs the second software system in a computer system of the third organization based on the second rating. Installation component 625 is an example of, or includes aspects of, the corresponding element described with reference to FIG. 5.

Computing Rating Information

Figure 7:
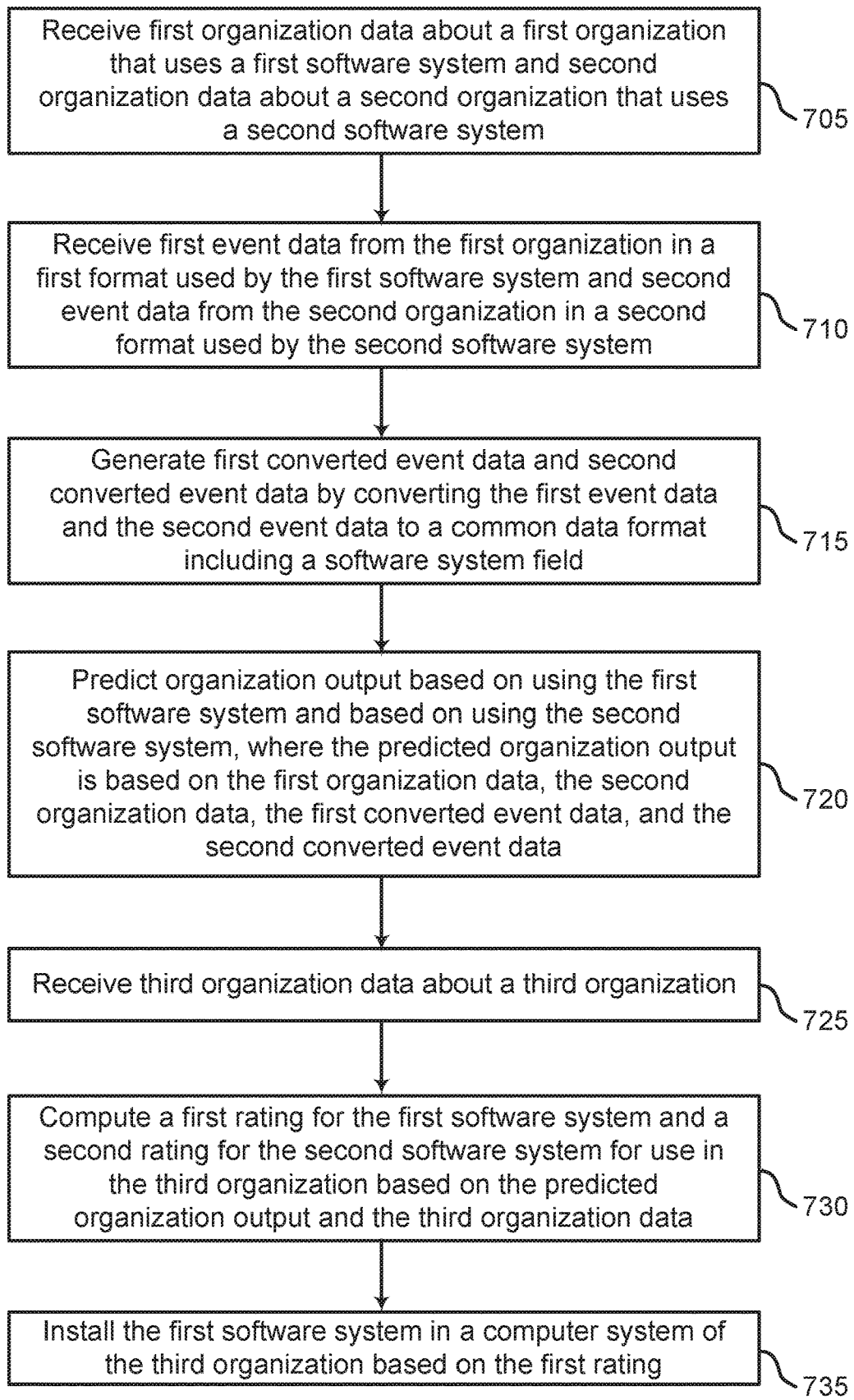
FIG. 7 shows an example of a process for software management according to aspects of the present disclosure.

In FIG. 7, a method, apparatus, and non-transitory computer readable medium for software management are described. One or more embodiments of the method, apparatus, and non-transitory computer readable medium include receiving first organization data about a first organization that uses a first software system and second organization data about a second organization that uses a second software system; receiving first event data from the first organization in a first format used by the first software system and second event data from the second organization in a second format used by the second software system; generating first converted event data and second converted event data by converting the first event data and the second event data to a common data format, the common data format including a software system field; predicting organization output based on using the first software system and based on using the second software system, wherein the predicted organization output is based on the first organization data, the second organization data, the first converted event data, and the second converted event data; receiving third organization data about a third organization; computing a first rating for the first software system and a second rating for the second software system for use in the third organization based on the predicted organization output and the third organization data; and installing the first software system in a computer system of the third organization based on the first rating.

Some examples of the method, apparatus, and non-transitory computer readable medium further include receiving training data comprising training organization data for a plurality of organizations and training organization output for each of the plurality of organizations, wherein each of the plurality of organizations uses the first software system or the second software system. Some examples further include training a model for predicting the organization output based on the training data.

Some examples of the method, apparatus, and non-transitory computer readable medium further include identifying a correspondence between a first property of the first format and a common property of the common data format. Some examples further include populating the common property of the first converted event data based on the first property of the first event data and the correspondence.

Some examples of the method, apparatus, and non-transitory computer readable medium further include computing an industry average rating based on the first rating and the second rating.

In some embodiments, the first organization data and the second organization data comprise elements from a list comprising function data, cost data, usage data, inputs data, outputs data, success metrics data, efficiency data, throughput data, or any combination thereof.

In some embodiments, the usage data comprises number of requests, average request duration, percentage of requests that is resolved or rejected, types of tasks spawned, number of total users, frequent users, and number of bottlenecks.

Some examples of the method, apparatus, and non-transitory computer readable medium further include identifying a first department of the first organization that uses the first software system. Some examples further include identifying a second department of the second organization that corresponds to the first department of the first organization. Some examples further include identifying the second software system based on the second department of the second organization.

In some examples, the first software system does not produce data in the second data format. In some embodiments, the first software system has a software category from a list comprising a human resources category, a project management category, a code tracking category, an intellectual property tracking category, a marketing category, a customer relationship management category, and an accounting category.

In some embodiments, the second software system comprises a same category as the first software system. In some examples, the first event data and the second event data comprise task creation data, task state change data, task completion data, or any combination thereof.

FIG. 7 shows an example of a process for software management according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 705, the system receives first organization data about a first organization that uses a first software system and second organization data about a second organization that uses a second software system. In some cases, the operations of this step refer to, or may be performed by, a software management apparatus as described with reference to FIG. 5.

In some cases, software tools and third-party vendors constitute a major part of company expenses. Evaluating a company's return on investment (ROI) or if the company has the most appropriate tools for jobs/tasks is challenging. Similarly, it may be difficult to know if the issues are on the side of the organization itself or the third-party vendors or if the competitors are running their operations more efficiently. In some examples, companies work with multiple tools (for example, hundreds or even thousands of tools) for financial planning, legal processing, etc. According to an embodiment, the software management system receives first organization data about a first organization that uses a first software system and second organization data about a second organization that uses a second software system, in collaboration with project management software (e.g., Workfront). The software management system includes benchmarking the end-to-end work systems of a company.

At operation 710, the system receives first event data from the first organization in a first format used by the first software system and second event data from the second organization in a second format used by the second software system. In some cases, the operations of this step refer to, or may be performed by, a software management apparatus as described with reference to FIG. 5.

According to an embodiment, the software management apparatus receives first event data from the first organization in a first format used by the first software system and second event data from the second organization in a second format used by the second software system. The data collected about each tool includes event data such as function, cost, usage, inputs or outputs, success metrics, efficiency and throughput, and issues. In some cases, multiple logos appear in different service categories since multiple tools offer different services, and the services can be used for different purposes. The software management system can identify the functionality from a service that is being used for different purposes. Data related to the cost may include contract expense and man hours. Similarly, the usage details of the tool include number of requests, average request duration, percentage of requests that get resolved or rejected, types of tasks spawned, number of total users, frequent users, number of bottlenecks or stalls, etc.

Additionally, tool inputs or outputs identify which tools or services are categorized as upstream or categorized as downstream. In some examples, tools are able to measure whether the work is completed in the tool (i.e., success vs. failure). A search engine optimization (SEO) tool is used by business to report costs, returns, ROI and optimization results. The exact metrics may vary widely across tool categories, but may be uniform inside a given category (such as search engine optimization tools). Combining success data with tool usage data would provide insight into overall tool performance rather than limited to department performance. For example, if a user only checks if the campaigns are successful (i.e., returning positive results), the user may never know that the campaigns are less successful than industry average. This may be because the campaigns of the user are set up poorly, or the user may work with a less effective tool. Combining tool level benchmarks with success data helps a user determine both success level and causes.

Additionally or alternatively, the software management system relies on success metrics from a system level to evaluate the performance of a particular tool in the larger picture and not in a silo. A target company may also evaluate whether or not other companies in the industry can obtain more from the tool (e.g., functions, features, usage) than the target company. There may be issues associated with the tool, for example, service requests, failed tasks, unassigned tasks, and low performance.

At operation 715, the system generates first converted event data and second converted event data by converting the first event data and the second event data to a common data format, the common data format including a software system field. In some cases, the operations of this step refer to, or may be performed by, a data conversion component as described with reference to FIGS. 5 and 6.

At operation 720, the system predicts organization output based on using the first software system and based on using the second software system, where the predicted organization output is based on the first organization data, the second organization data, the first converted event data, and the second converted event data. In some cases, the operations of this step refer to, or may be performed by, a prediction network as described with reference to FIGS. 5 and 6.

According to an embodiment of the present disclosure, the software management system determines what software tools a company is currently using, how the company is using the tools, how these tools enable a large workflow and the impact of the tools on the overall success of the company can be predicted upon benchmarking.

At operation 725, the system receives third organization data about a third organization. In some cases, the operations of this step refer to, or may be performed by, a software management apparatus as described with reference to FIG.

5. In some cases, the third organization is also referred to as a target company or a target business.

At operation 730, the system computes a first rating for the first software system and a second rating for the second software system for use in the third organization based on the predicted organization output and the third organization data. In some cases, the operations of this step refer to, or may be performed by, a rating component as described with reference to FIGS. 5 and 6.

According to an embodiment, the software management system can incorporate large amount of additional data from other services (e.g., Workfront, Experience Cloud, etc.), which create multiple different styles of company models for comparison. The marketing tools of a company provide information such as a company's vertical(s), costs, margins, advertising success, advertising methods (i.e., display vs. search), types of products, etc. The marketing tools can create different types of company models for comparison. For example, a company's numbers may be compared against the benchmarks of other organizations that sell similar products, have similar internal organizations, use similar marketing methods, have similar budgets, use similar tools, have similar goals in growth margins, etc. Benchmarking at a low-level enables multiple ways to perform comparisons between different companies. Accordingly, a rating component of the system is configured to compute a first rating for the first software system and a second rating for the second software system for use in the third organization based on the predicted organization output and the third organization data from a target company.

At operation 735, the system installs the first software system in a computer system of the third organization based on the first rating. In some cases, the operations of this step refer to, or may be performed by, an installation component as described with reference to FIGS. 5 and 6.

Generating Recommended Software Configuration

Figure 8:
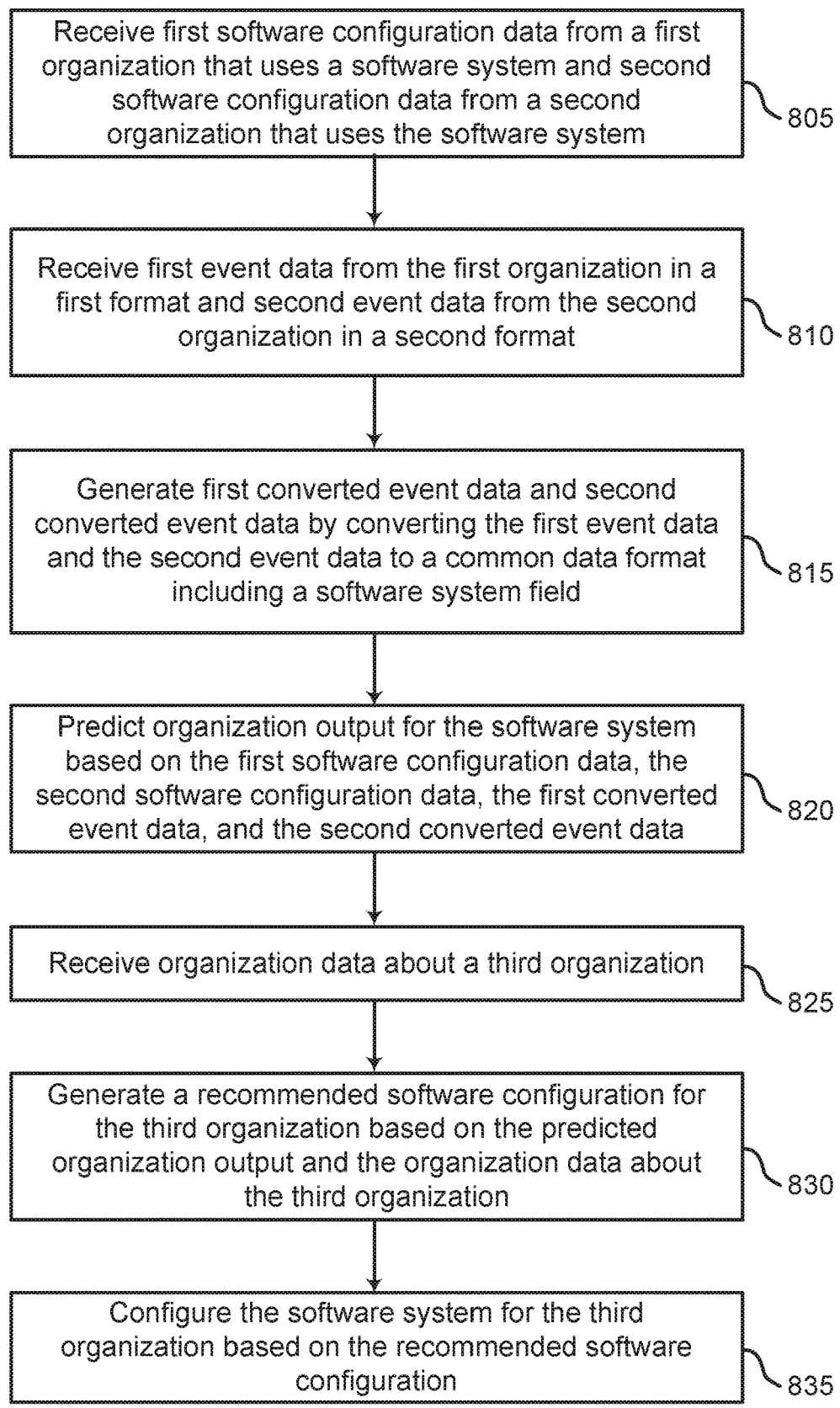
FIG. 8 shows an example of a process for software management based on recommended software configuration according to aspects of the present disclosure.

In FIG. 8, a method, apparatus, and non-transitory computer readable medium for software management are described. One or more embodiments of the method, apparatus, and non-transitory computer readable medium include receiving first software configuration data from a first organization that uses a software system and second software configuration data from a second organization that uses the software system; receiving first event data from the first organization in a first format and second event data from the second organization in a second format; generating first converted event data and second converted event data by converting the first event data and the second event data to a common data format, the common data format including a software configuration field; predicting organization output for the software system based on the first software configuration data, the second software configuration data, the first converted event data, and the second converted event data; receiving organization data about a third organization; generating a recommended software configuration for the third organization based on the predicted organization output and the organization data about the third organization; and configuring the software system for the third organization based on the recommended software configuration.

Some examples of the method, apparatus, and non-transitory computer readable medium further include receiving training data comprising training software configuration data for a plurality of organizations and training organization output for each of the plurality of organizations. Some examples further include training a model for predicting the organization output based on the training data.

In some embodiments, the model comprises a machine learning model that is trained based on industry information, company structure information, geography information, toolset information, or arrangement information.

Some examples of the method, apparatus, and non-transitory computer readable medium further include computing a rating for the software system for use in the third organization based on the predicted organization output.

In some embodiments, the organization data comprises elements from a list comprising blogs, product reviews, current trends, employee's past experience, company values, toolset, number of users, company size, and user geography. In some examples, the organization data is obtained from a lightweight directory access protocol (LDAP).

FIG. 8 shows an example of a process for software management based on recommended software configuration according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 805, the system receives first software configuration data from a first organization that uses a software system and second software configuration data from a second organization that uses the software system. In some cases, the operations of this step refer to, or may be performed by, a software management apparatus as described with reference to FIG. 5.

In some cases, there is little empirical data available when making these selections despite the cost and importance of the decisions to select a tool. Companies may select a software tool based on blogs, product reviews, current trends, or employee's previous experiences at other companies. However, there are additional factors that influence the success of a tool (e.g., company values, vertical, current toolset, number of users, company size, user geography, etc.). As a result, a subjective decision based on product reviews or previous experience in a different eco-system may lead to selection of an unsuitable tool. According to an embodiment of the present disclosure, a software management apparatus relies on a company's actual data combined with industry benchmarks to select the appropriate software tool. The software management apparatus system receives first software configuration data from a first organization that uses a software system and second software configuration data from a second organization that uses the same software system.

At operation 810, the system receives first event data from the first organization in a first format and second event data from the second organization in a second format. In some cases, the operations of this step refer to, or may be performed by, a software management apparatus as described with reference to FIG. 5.

At operation 815, the system generates first converted event data and second converted event data by converting the first event data and the second event data to a common data format, the common data format including a software configuration field. In some cases, the operations of this step refer to, or may be performed by, a data conversion component as described with reference to FIGS. 5 and 6.

At operation 820, the system predicts organization output for the software system based on the first software configuration data, the second software configuration data, the first converted event data, and the second converted event data. In some cases, the operations of this step refer to, or may be performed by, a prediction network as described with reference to FIGS. 5 and 6.

One or more embodiments of the present disclosure rely on company benchmarking that enable benchmarking across an entire company work eco-system, including its tools, integrations, geographics, processes, etc. Automated initial setup and tool configuration can minimize an overall cold-start and the cost of adding additional tools. According to an embodiment, the company data and industry benchmarking are used to recommend the suitable tools and services based on the industry, vertical, methodologies, geography, and current eco-system. A user interface (UI) is implemented to explain a set of opportunities enabled by company work benchmarking.

At operation 825, the system receives organization data about a third organization. In some cases, the operations of this step refer to, or may be performed by, a software management apparatus as described with reference to FIG. 5.

At operation 830, the system generates a recommended software configuration for the third organization based on the predicted organization output and the organization data about the third organization. In some cases, the operations of this step refer to, or may be performed by, a software management apparatus as described with reference to FIG. 5. In some other cases, the operations of this step refer to, or may also be performed by, a configuration component of the apparatus as described with reference to FIG. 5.

In an example, GitHub may determine issue tracking is needed based on the benchmarked data of similar companies. The benchmarks are examined to determine whether a target company or user is likely to utilize GitHub or a separate issue tracking software. The decision may be based on whether and/or when the user clicks on Jira. Additional decisions may be made based on other tools available (e.g., repository manager such as Artifactory, Docker) and similar companies handling integration and deployment management. Multiple tools store configuration files in consistent locations which can be examined. Once all the existing tools are added to the company workline, the software management system can finalize assumptions about each software tool and assume the most likely configuration options before walking the user through decisions for manual approval.

At operation 835, the system configures the software system for the third organization based on the recommended software configuration. In some cases, the operations of this step refer to, or may be performed by, a configuration component as described with reference to FIG. 5.

According to an embodiment, the software management system can be trained using machine learning to recommend software applications or tools based on company benchmarking, industry, vertical, geography, company structure, etc. The software management system includes tool recommendation to enhance company-wide work performance. According to an embodiment, the software management system identifies strengths and weaknesses of tools based on the work of tools with upstream and downstream tools in the eco-system using company benchmarks and other metrics. The initial eco-system configuration and the initial tool configuration may be set up based on benchmarking.

Training a Machine Learning Model

Figure 9:
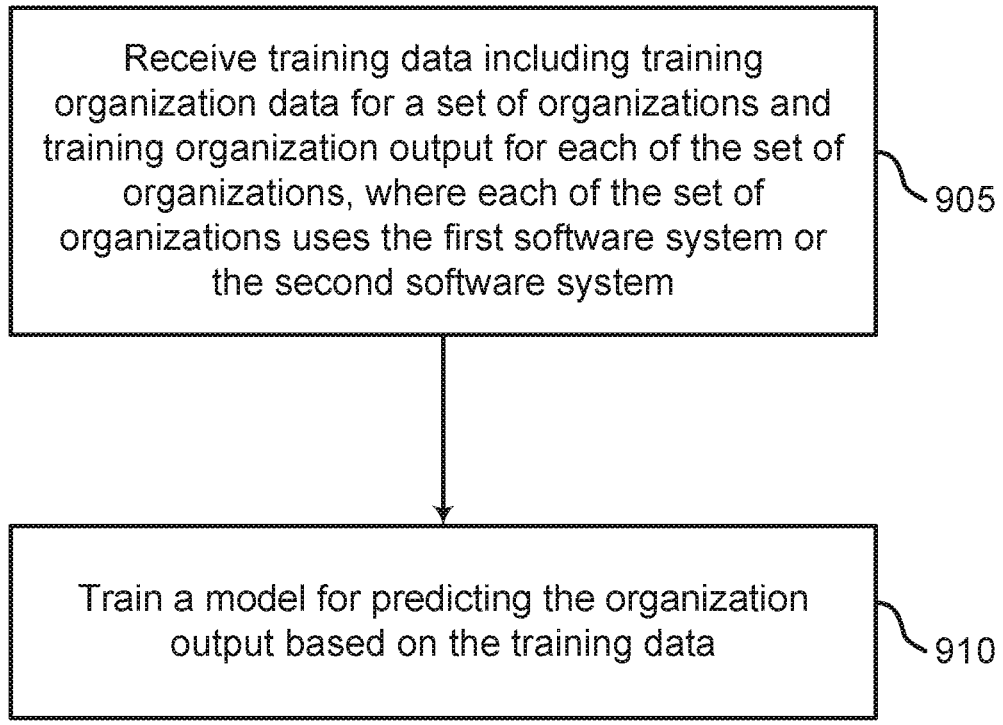
FIGS. 9 and 10 show examples of a process for training a machine learning model for predicting organization output according to aspects of the present disclosure.

FIG. 9 shows an example of a process for training a machine learning model for predicting organization output according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

One or more embodiments of the present disclosure use supervised training techniques. Supervised learning is one of three basic machine learning paradigms, alongside unsupervised learning and reinforcement learning. Supervised learning is a machine learning technique based on learning a function that maps an input to an output based on example input-output pairs. Supervised learning generates a function for predicting labeled data based on labeled training data consisting of a set of training examples. In some cases, each example is a pair consisting of an input object (typically a vector) and a desired output value (i.e., a single value, or an output vector). A supervised learning algorithm analyzes the training data and produces the inferred function, which can be used for mapping new examples. In some cases, the learning results in a function that correctly determines the class labels for unseen instances. In other words, the learning algorithm generalizes from the training data to unseen examples.

Accordingly, during the training process, the parameters and weights of a software management apparatus are adjusted to increase the accuracy of the result (i.e., by minimizing a loss function which corresponds in some way to the difference between the current result and the target result). The weight of an edge increases or decreases the strength of the signal transmitted between nodes. In some cases, nodes have a threshold below which a signal is not transmitted at all. In some examples, the nodes are aggregated into layers. Different layers perform different transformations on their inputs. The initial layer is known as the input layer and the last layer is known as the output layer. In some cases, signals traverse certain layers multiple times.

The term loss function refers to a function that impacts how a machine learning model is trained in a supervised learning model. Specifically, during each training iteration, the output of the model is compared to the known annotation information in the training data. The loss function provides a value for how close the predicted annotation data is to the actual annotation data. After computing the loss function, the parameters of the model are updated accordingly, and a new set of predictions are made during the next iteration.

At operation 905, the system receives training data including training organization data for a set of organizations and training organization output for each of the set of organizations, where each of the set of organizations uses the first software system or the second software system. In some cases, the operations of this step refer to, or may be performed by, a training component as described with reference to FIG. 5.

According to an embodiment, a software management system can be trained to recommend possible owners for different task types based on LDAP information, etc. The software management system may significantly shorten the time to initial value (i.e., from months or years to minutes or days) by replacing the original assembly and configuration process with artificial intelligence (AI) methods.

At operation 910, the system trains a model for predicting the organization output based on the training data. In some cases, the operations of this step refer to, or may be performed by, a training component as described with reference to FIG. 5.

According to an embodiment, lightweight directory access protocol (LDAP) can be used as features for machine learning to create models that are appropriate for a target company. The machine learning models can be based on industry, vertical, company structure, geography, and the toolset and arrangement. The machine learning models are fine-tuned or have increased performance when the user adds another tool to the company workline or moves tools or tool categories across the company workline. The benchmarking data and intelligent questions are used to fit the company to a model with the highest performance and make a first pass at connecting and configuring the integrations into an efficient workline for the target company.

Figure 10:
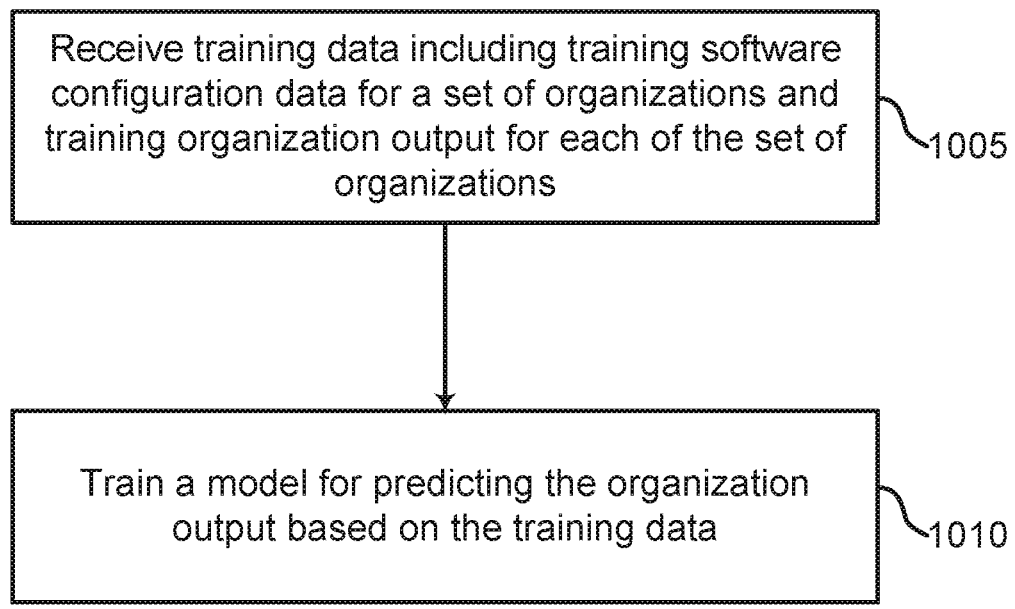

FIG. 10 shows an example of a process for training a machine learning model for predicting organization output according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1005, the system receives training data including training software configuration data for a set of organizations and training organization output for each of the set of organizations. In some cases, the operations of this step refer to, or may be performed by, a training component as described with reference to FIG. 5.

In some cases, configuration may be automated based on setting up of same tools by similar companies. The software management system uses machine learning and company benchmarking to automate the initial setup process and system configuration, thus enabling selection and configuration of new tools and incorporating the tools into a customized work management system.

At operation 1010, the system trains a model for predicting the organization output based on the training data. In some cases, the operations of this step refer to, or may be performed by, a training component as described with reference to FIG. 5. The software management system configures a tool based on performance and usage of a software tool by other companies and the system is trained to recommend one or more software tools based on at least empirical internal data.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method for software management, comprising:
   receiving first organization data about a first organization that uses a first software system and second organization data about a second organization that uses a second software system;
   receiving first event data from the first organization in a first format used by the first software system and second event data from the second organization in a second format used by the second software system, wherein the first format is different from the second format;
   generating first converted event data and second converted event data by converting the first event data and the second event data to a common data format, the common data format including a software system field;
   predicting organization output based on using the first software system and based on using the second software system, wherein the predicted organization output is based on the first organization data, the second organization data, the first converted event data, and the second converted event data;
   receiving third organization data about a third organization;
   computing a first rating for the first software system and a second rating for the second software system for use in the third organization based on the predicted organization output and the third organization data, wherein the first rating indicates a matching score between the first software system and the third organization, and wherein the second rating indicates a matching score between the second software system and the third organization; and
   installing the first software system in a computer system of the third organization based on the first rating, wherein the first software system performs functions of the third organization including generating data in the first format.

2. The method of claim 1, further comprising:
   receiving training data comprising training organization data for a plurality of organizations and training organization output for each of the plurality of organizations, wherein each of the plurality of organizations uses the first software system or the second software system; and
   training a model for predicting the organization output based on the training data.

3. The method of claim 1, further comprising:
   identifying a correspondence between a first property of the first format and a common property of the common data format; and populating the common property of the first converted event data based on the first property of the first event data and the correspondence.

4. The method of claim 1, further comprising:
computing an industry average rating based on the first rating and the second rating.

5. The method of claim 1, wherein:
the first organization data and the second organization data comprise elements from a list comprising function data, cost data, usage data, inputs data, outputs data, success metrics data, efficiency data, throughput data, or any combination thereof.

6. The method of claim 5, wherein:
the usage data comprises number of requests, average request duration, percentage of requests that is resolved or rejected, types of tasks spawned, number of total users, frequent users, and number of bottlenecks.

7. The method of claim 1, further comprising:
identifying a first department of the first organization that uses the first software system;
identifying a second department of the second organization that corresponds to the first department of the first organization; and
identifying the second software system based on the second department of the second organization.

8. The method of claim 1, wherein:
the first software system does not produce data in the second data format.

9. The method of claim 1, wherein:
the first software system has a software category from a list comprising a human resources category, a project management category, a code tracking category, an intellectual property tracking category, a marketing category, a customer relationship management category, and an accounting category.

10. The method of claim 9, wherein:
the second software system comprises a same category as the first software system.

11. The method of claim 1, wherein:
the first event data and the second event data comprise task creation data, task state change data, task completion data, or any combination thereof.

12. An apparatus for software management, comprising:
at least one processor; and
at least one memory storing instructions executable by the at least one processor to perform operations including:
receiving first organization data about a first organization that uses a first software system and second organization data about a second organization that uses a second software system;
receiving first event data from the first organization in a first format used by the first software system and second event data from the second organization in a second format used by the second software system, wherein the first format is different from the second format;
generating first converted event data and second converted event data by converting the first event data and the second event data to a common data format, the common data format including a software system field;
predicting organization output based on using the first software system and based on using the second software system, wherein the predicted organization output is based on the first organization data, the second organization data, the first converted event data, and the second converted event data;
receiving third organization data about a third organization;
computing a first rating for the first software system and a second rating for the second software system for use in the third organization based on the predicted organization output and the third organization data, wherein the first rating indicates a matching score between the first software system and the third organization, and wherein the second rating indicates a matching score between the second software system and the third organization; and
installing the first software system in a computer system of the third organization based on the first rating, wherein the first software system performs functions of the third organization including generating data in the first format.

13. The apparatus of claim 12, wherein the instructions are further executable by the at least one processor to perform operations including:
receiving training data comprising training organization data for a plurality of organizations and training organization output for each of the plurality of organizations, wherein each of the plurality of organizations uses the first software system or the second software system; and
training a model for predicting the organization output based on the training data.

14. The apparatus of claim 12, wherein the instructions are further executable by the at least one processor to perform operations including:
identifying a correspondence between a first property of the first format and a common property of the common data format; and
populating the common property of the first converted event data based on the first property of the first event data and the correspondence.

15. The apparatus of claim 12, wherein the instructions are further executable by the at least one processor to perform operations including:
computing an industry average rating based on the first rating and the second rating.

16. The apparatus of claim 12, wherein the instructions are further executable by the at least one processor to perform operations including:
identifying a first department of the first organization that uses the first software system;
identifying a second department of the second organization that corresponds to the first department of the first organization; and
identifying the second software system based on the second department of the second organization.

17. A non-transitory computer-readable medium storing code for software management, the code comprising instructions executable by at least one processor to perform operations including:
receiving first organization data about a first organization that uses a first software system and second organization data about a second organization that uses a second software system;
receiving first event data from the first organization in a first format used by the first software system and second event data from the second organization in a second format used by the second software system, wherein the first format is different from the second format;
generating first converted event data and second converted event data by converting the first event data and the second event data to a common data format, the common data format including a software system field;

predicting organization output based on using the first software system and based on using the second software system, wherein the predicted organization output is based on the first organization data, the second organization data, the first converted event data, and the second converted event data;

receiving third organization data about a third organization;

computing a first rating for the first software system and a second rating for the second software system for use in the third organization based on the predicted organization output and the third organization data, wherein the first rating indicates a matching score between the first software system and the third organization, and wherein the second rating indicates a matching score between the second software system and the third organization; and installing the first software system in a computer system of the third organization based on the first rating, wherein the first software system performs functions of the third organization including generating data in the first format.

18. The non-transitory computer-readable medium of claim 17, wherein the instructions are further executable by the at least one processor to perform operations including:
receiving training data comprising training organization data for a plurality of organizations and training organization output for each of the plurality of organizations, wherein each of the plurality of organizations uses the first software system or the second software system; and
training a model for predicting the organization output based on the training data.

19. The non-transitory computer-readable medium of claim 17, wherein the instructions are further executable by the at least one processor to perform operations including:
identifying a correspondence between a first property of the first format and a common property of the common data format; and
populating the common property of the first converted event data based on the first property of the first event data and the correspondence.

20. The non-transitory computer-readable medium of claim 17, wherein the instructions are further executable by the at least one processor to perform operations including:
computing an industry average rating based on the first rating and the second rating.

* * * * *